Sept. 6, 1955  B. S. SNOW  2,717,181

SAND HANDLING EQUIPMENT

Filed Dec. 13, 1954

Inventor:
Barton S. Snow
By: Schroeder, Hofgren,
Brady & Wegner
Attorneys

United States Patent Office 2,717,181
Patented Sept. 6, 1955

2,717,181

SAND HANDLING EQUIPMENT

Barton S. Snow, Batavia, Ill., assignor to T. W. Snow Construction Company, Inc., a corporation of Illinois Application December 13, 1954, Serial No. 474,876

7 Claims. (Cl. 302—59)

This invention relates to a device for stopping the flow of granular material under air pressure out of a discharging pipeline.

There have been several applications of carrying a granular material by air pressure through a pipeline to a delivery point. One such application is found in railroad servicing yards with the use of tanks holding a specially dried sand for the sand boxes of locomotives. Ordinarily, a large tank at a central location feeds sand to smaller trackside tanks which are elevated so that sand can be put into the locomotive boxes by gravity flow from these smaller tanks. Air pressure is usually available around the yards so that it may be used to transport the dry sand through pipelines from the storage space to the smaller trackside tanks. In instances where these lines are particularly long or where the sand has a high percentage of fines, the pipeline may become clogged. Ordinarily, the 60 to 100 lbs. of air pressure at the storage tank might be reduced to 30 or 40 lbs. at the smaller trackside tank but when clogging occurs, the pressure may build up quite rapidly to 100 lbs. or more. Under these conditions, the clogged mass may be blown much like an explosion or blast into the smaller trackside tank whereupon the excessive air pressure will carry the sand on through the tank and out the vents, spreading the sand over the adjacent area. This is to be avoided since it not only wastes sand but creates an inconvenience for any nearby workman.

It is the primary object of this invention to provide an automatic valve for containing blasts of granular material under air pressure within a tank without permitting the material to be blown out of the normally open vents of the tank.

Another object is to provide a structure for stopping flow out of a material delivering pipeline when the tank into which the line is delivering becomes full and at the same time containing blasts of material into the tank.

Another object is to provide a device for admitting granular material into a tank by air pressure flow which requires little attention or service and has but one moving part which is gravity operated.

Other objects, features, and advantages of the present invention will be apparent from the following description of one embodiment illustrated in the accompanying drawings in which.

Figure 1:
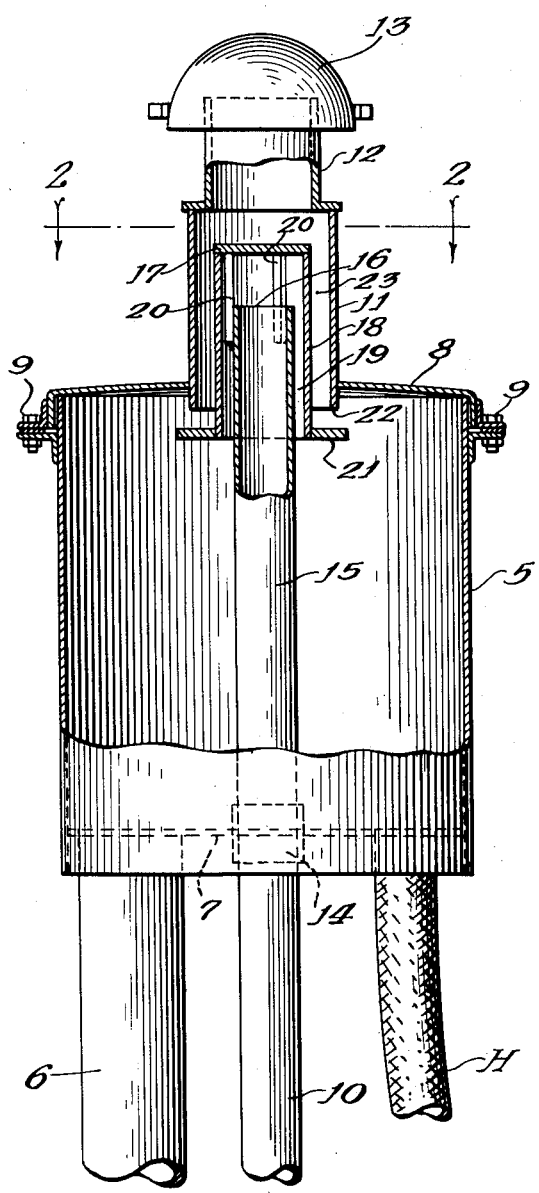
Figure 1 is a fragmentary elevational view, partly in section, of a tank having the structure of the invention therein.
Figure 2:
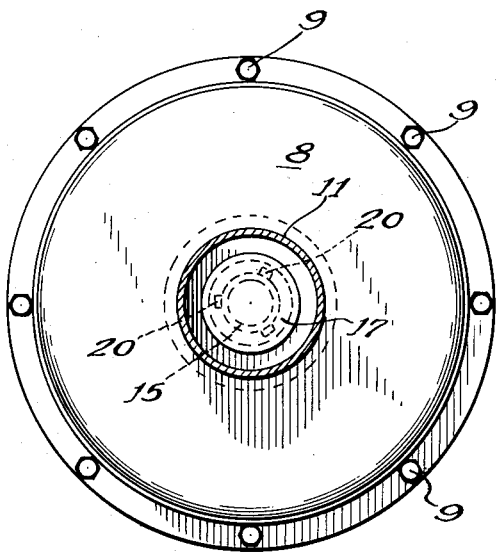
Figure 2 is a horizontal sectional view taken substantially along line 2—2 in Figure 1.

While the invention is shown in the drawings as applying to a tank ordinarily used for the purpose of supplying a locomotive sand box with sand, the device of the invention may have application in large storage tanks, bins and other storage vessels. Also, the particular embodiment is one used for the purposes of storing dry sand whereas the invention might also be used in the handling of other granular materials.

In the embodiment illustrated, a sand storage tank 5 is shown as supported upon a pipe standard 6 at an elevated position so that a flexible hose H may be used to fill the sand box of a locomotive by gravity. The tank has a bottom 7 resting upon the support 6 and into it the hose H passes with suitable valve mechanism (not shown). This trackside tank 5 has a top cover 8 held in place by a number of bolts 9 which may be easily removed so that the interior of the tank may be easily reached for service, cleaning and the like. A pipeline 10 of about 3 in. size may be used to convey sand and air into the tank 5. In some instances, the supporting pipe 6 and sand supply pipe 10 are concentrically mounted rather than being side by side as illustrated.

Ordinarily, some means is provided for the escape of the air used to convey the sand into the tank. In this instance, a cylindrical air duct 11 is welded or otherwise secured in the top cover 8 so that it extends above the top cover. A reduced portion 12 is upwardly open to the atmosphere and covered with a dome-shaped cap 13 to prevent rain, snow and the like from entering the tank. For servicing purposes, the air duct may be removed with the top cover 8 as a unit.

Figures 3, 4:
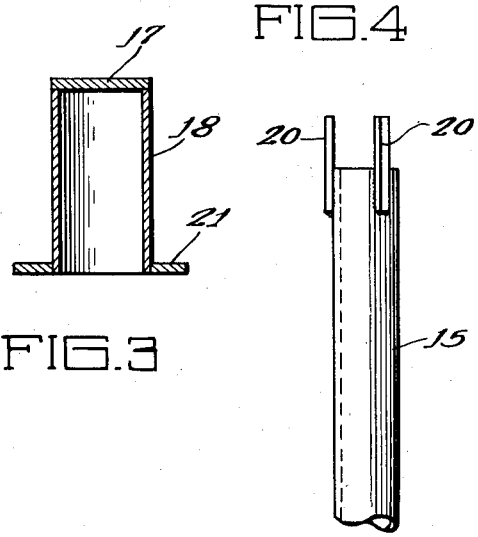
Figure 3 is a vertical sectional view through the valve member of the invention removed from its environment as illustrated in Figure 1.
Figure 4 is a fragmentary elevational view of the discharge end of the pipeline shown in Figure 1.

Tanks may vary considerably in vertical depth and size so that ordinarily the sand supply pipe 10 is taken to a coupling 14 at the bottom of the tank and an extension pipe 15 is attached to the coupling so as to extend the pipe through the tank into the upper regions thereof. In the particular embodiment illustrated, the upper end 16 of the pipe is actually above the level of the cover 8 and extends into the air duct 11. Ordinarily, the sand and air passes upwardly over the end of the pipe in a slowly moving gentle flow. Some of the sand may be quite forcibly ejected from the end of the pipe so that it might pass on out of the tank were it not for a baffle arrangement to stop such flow. In the present instance, all incoming sand may impinge upon a plate 17 forming a closed end of a cylindrical sleeve 18 telescoped over the end of the pipeline rather loosely so as to form a space 19 through which the sand may fall into the tank. As illustrated in Figure 4, three guide rods 20 are welded or otherwise secured to the outside of the pipe extension 15 so as to bear on the underside of the plate 17 and hold the plate above the end 16 of the pipeline. The rods 20 not only form a stop for the downward movement of the sleeve but also guide it in any vertical movement that may occur.

Under normal operation, the sleeve 18 will rest in the position shown in Figure 1 against the upper ends of the guide rods 20. However, should the pipeline 10 become clogged with a resultant pressure build-up, a blast of sand and air under excessive pressure may pass out of the pipeline and impinge upon the plate 17 with such a force that the sleeve will be carried upwardly. In the past, such blasts have usually resulted in the carrying of the sand on out the air duct so that it would be spread over a rather wide area around the base of the tank. In the present invention, such blasts are contained within the tank.

The particular means for containing the blast within the tank operates automatically. The sleeve 18 is provided with an annular outwardly extending lip 21 which is secured to the bottom thereof and extends outwardly a sufficient distance to engage the lower end 22 of the air duct 11 when the sleeve is raised. Under normal operation, air passing downwardly through the space 19 between the pipeline and sleeve would gently find its way into the space 23 between the sleeve and air duct and then on through the duct to atmosphere. When a blast occurs, the sleeve may be carried upwardly, bringing the lip 21 into contact with the lower edge 22 of the air duct, thus shutting off the passage 23 from the interior of the tank. By reducing the velocity of the air under these circumstances, the sand will automatically drop into the tank so that by the time the weight of the sleeve carries itself back to rest on the posts 20, the sand is out of suspension and only air escapes through the air duct.

An additional feature of the present invention is the retention of an automatic stopping of flow when the tank becomes full. When sand builds up to the level of the lip 21, it would be noted that the passage 19 between the sleeve and the pipeline would become closed at the lower end. The passage is quite long in comparison to its width so that sand may accumulate and build up in the annular space 19 when a sufficient height has so accumulated. The pipeline extension 15 will become clogged with the sand to effectively stop not only the flow of sand but also flow of air. Once the flow has been stopped, it may be reinstated by simply draining sand through the servicing hose H to lower the level. There is thus no necessity for an operator to be always present to shut off the air valve at the supply station which might be some distance from the trackside service tank. The stopping of the flow may be accompanied by a slight lifting of the sleeve off of the supporting posts 20. This lifting may continue to such an extent that the air duct will be closed, but in either instance, the pipeline will eventually become clogged sufficiently to stop flow before sand is carried through the duct and outside of the tank.

The foregoing detailed description has been given for clearness of understanding only, and no unnecessary limitations should be understood therefrom, for some modifications will be obvious to those skilled in the art.

I claim:

1. In a granular material storage tank, means for admitting granular material to the tank, comprising: an upwardly open pipe within the tank for discharging granular material carried in an air stream; a sleeve telescoped loosely about the pipe and having a closed end above the open end of the pipe so that incoming material may impinge on the closed end and then fall into the tank through the space between the sleeve and pipe; an air duct for conducting air out of the tank and having a lower edge about the sleeve; and a lip on the sleeve adapted to be raised into contact with the lower edge of the duct when the sleeve is raised by incoming material and excessive air pressure, temporarily closing the air duct and preventing the air from blowing material out of the tank.

2. Apparatus as set forth in claim 1 wherein spacers are secured to the pipe for supporting the closed end of the sleeve above the open end of the pipe, said spacers guiding the sleeve in its movement under influence of incoming material and air.

3. Apparatus as set forth in claim 1 wherein the sleeve and pipe provide a long narrow annular passage through which the material passes in entering the tank so that material may pack in the passage to stop further flow when the level of material reaches the sleeve.

4. In a sand storage tank, means for admitting sand to the tank, comprising: an upwardly open pipe within the tank for discharging sand carried in an air stream; a cylindrical sleeve telescoped loosely about the pipe and having a closed end over the open end of the pipe; a sleeve support holding the closed end above the pipe so that incoming sand may impinge on the closed end and then fall into the tank through the space between the sleeve and pipe; a cylindrical air duct portion about the sleeve for conducting air out of the tank and having a lower edge above the bottom of the sleeve; and an outwardly extending annular lip on the bottom of the sleeve adapted to be raised into contact with the lower edge of the duct when the sleeve is raised by incoming sand and excessive air pressure, temporarily closing the air duct and preventing the air from blowing sand out of the tank, said sleeve extending downwardly from the open end of the pipe so as to compact sand in the space between the sleeve and pipe when the sand level in the tank reaches the lower end of the sleeve, preventing overfilling of the tank.

5. In an elevated sand storage tank, means for admitting sand to the tank, comprising: an upwardly open pipe within the tank for discharging sand carried in an air stream; a sleeve telescoped loosely about the pipe and having a closed end above the open end of the pipe; upstanding sleeve support members secured to the pipe and holding the closed end above the pipe so that incoming sand may impinge on the closed end and then pass between the sleeve and pipe into the tank; an air duct in the tank extending about the sleeve for conducting air out of the tank; and an outwardly extending lip secured to the sleeve and movable therewith when the sleeve is raised by incoming sand and excessive air pressure, said air duct having a lower edge above the lip when the sleeve is at rest on said support members and contacting the lip when the sleeve is raised to temporarily close the air duct and prevent excessive air pressure from blowing sand out of the tank.

6. In an elevated sand storage tank for filling the sand boxes of locomotive by gravity, means for admitting sand to the tank, comprising: an upwardly open pipeline extending into the upper portion of the tank and being connected with a source of sand and gas under pressure to carry the sand therethrough; a sleeve loosely telescoped about the end of the pipe and having a closed end over the pipe; spacers supporting said closed end above the open end of the pipe so that incoming sand may impinge upon the closed end and then fall into the tank through the space between the sleeve and pipe; an air duct in the tank extending downwardly about the sleeve for venting air from the tank; and an annular lip secured to the sleeve and adapted to be moved upwardly against the lower edge of the duct for sealing off the air duct and preventing discharge of sand through the duct when sand is blown into the tank under excessive air pressure raising the sleeve.

7. In an elevated sand storage tank for filling the sand boxes of locomotives by gravity, means for admitting sand to the tank, comprising: an upwardly open pipeline extending into the upper portion of the tank and being connected with a source of sand and gas under pressure to carry the sand therethrough; an air duct in the tank extending downwardly about the pipe for venting air from the tank; and a valve member between the pipe and air duct including a sleeve loosely telescoped about the end of the pipe and having a closed end above the pipe so that incoming sand may impinge upon the closed end and then fall into the tank, an annular lip secured to the sleeve and adapted to be moved upwardly against the duct for sealing off the air duct and preventing discharge of sand through the duct when sand is blown into the tank under excessive air pressure raising the sleeve.

References Cited in the file of this patent

UNITED STATES PATENTS

| 2,271,148 | Becker | Jan. 27, 1942 |
| 2,684,124 | Hines | July 20, 1954 |
| 2,704,229 | Snow | Mar. 15, 1955 |